United States Patent [19]

Shiga et al.

[11] 4,235,984

[45] Nov. 25, 1980

[54] PROCESS FOR PRODUCING HIGHLY STEREOREGULAR α-OLEFIN POLYMERS

[75] Inventors: Akinobu Shiga; Yoshiharu Fukui, both of Niihama; Katsumi Hanji, Ibaraki; Toshio Sasaki, Niihama; Masahisa Okawa, Niihama; Hideaki Matsuura, Niihama; Yasuharu Yamada, Takatsuki, all of Japan

[73] Assignee: Sumitomo Chemical Company, Limited, Osaka, Japan

[21] Appl. No.: 11,676

[22] Filed: Feb. 12, 1979

[30] Foreign Application Priority Data

Feb. 23, 1978 [JP] Japan .................................. 53-20490
Mar. 9, 1978 [JP] Japan .................................. 53-27331

[51] Int. Cl.$^3$ ......................... C08F 4/02; C08F 10/06
[52] U.S. Cl. .............................. 526/127; 252/429 B; 526/125; 526/128; 526/139; 526/140; 526/141; 526/142; 526/351

[58] Field of Search ............... 526/125, 127, 128, 139, 526/140, 141, 142

[56] References Cited

U.S. PATENT DOCUMENTS

| | | | |
|---|---|---|---|
| 4,115,319 | 9/1978 | Scata et al. ........................... | 526/128 |
| 4,159,256 | 6/1979 | Sakurai et al. ....................... | 526/128 |

*Primary Examiner*—Edward J. Smith
*Attorney, Agent, or Firm*—Stevens, Davis, Miller & Mosher

[57] ABSTRACT

α-Olefin polymers of high stereoregularity are prepared by polymerizing the α-olefin with a catalyst prepared by mixing components (A), (B) and (C):

(A) a solid titanium component prepared from an organo-magnesium compound, a silicon halide compound and/or an aluminum halide compound, an electron donor and $TiCl_4$,
(B) an organoaluminum activator, and
(C) an electron donor.

9 Claims, 1 Drawing Figure

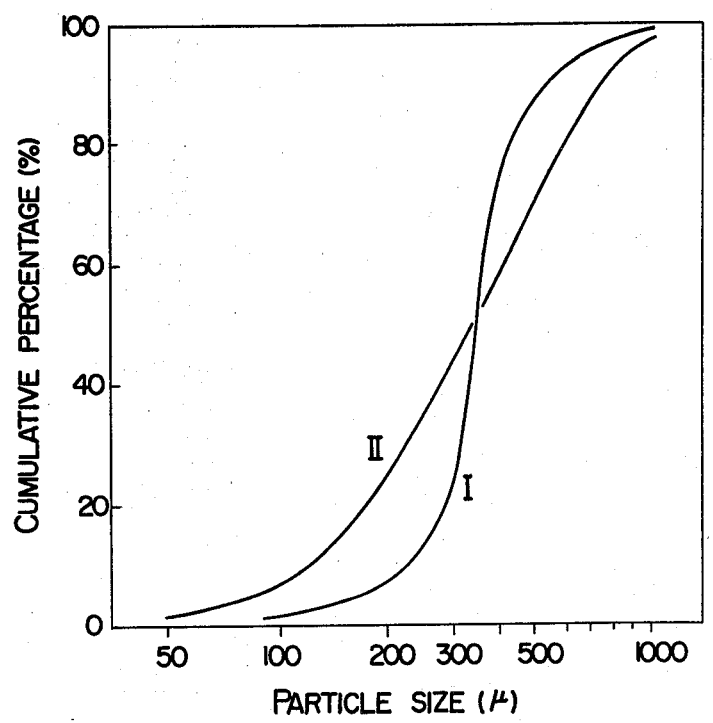

PROCESS FOR PRODUCING HIGHLY STEREOREGULAR α-OLEFIN POLYMERS

The present invention relates to a process for producing α-olefin polymers of high crystallinity. Generally, it is well known that crystalline olefin polymers are produced with the so-called Ziegler-Natta catalyst comprising a compound of a transition metal in Groups IV to VI of the periodic table and a metal in Groups I to III of the same table or an organo-compound thereof. In the industrial production of olefin polymers from olefins such as propylene, butene-1 and the like, titanium trichloride compositions, or titanium tetrachloride or titanium trichloride deposited on a magnesium-containing halide carrier are used as catalyst. In this process, the polymers are commonly obtained as slurry, and their bulk density, average particle size and particle size distribution affect production capacity so largely that these are important factors in terms of improvement in the efficiency of reactor.

In general, polymerization processes with a catalyst on carriers have the drawbacks that the resulting polymers are small in bulk density and average particle size and are broad in particle size distribution. This process produces amorphous polymers as byproduct in addition to highly stereoregular olefin polymers of high industrial value. The amorphous polymers have little industrial value and exert a large adverse effect on the mechanical properties of the processed products of the olefin polymers such as film, fiber and the like. Further, formation of the amorphous polymers uselessly consumes a monomer as raw material, and at the same time equipments for removal of the polymers become necessary. This is a serious disadvantage from the industrial point of view. Consequently, if the formation of such amorphous polymers is completely, or, if any, substantially inhibited, this becomes a great advantage.

On the other hand, catalyst residues remain in the olefin polymers produced by this process, adversely affecting the stability and processability of the polymers. Accordingly, equipment for removal of the catalyst residues and stabilization of the polymers become necessary. These drawbacks of the process can be improved by increasing catalytic activity which is expressed in the yield of olefin polymer per unit weight of catalyst. Further, equipment for removal of the catalyst residues become unnecessary, which makes it possible to reduce the manufacturing cost of the olefin polymer.

As examples of a catalyst on a magnesium-containing carrier, there may be given reaction products from a hydroxyl-containing magnesium compound, titanium alcoholate and silicon tetrahalide (U.S. Pat. No. 3,833,515) and catalysts on a carrier produced by reacting a magnesium compound containing an organic oxygenated compound with a titanium compound (U.S. Pat. Nos. 3,718,636 and 3,901,863). These catalysts show a high activity in ethylene polymerization, so that they are useful. But they can not be used at all for the stereoregular polymerization of propylene, butene-1 or the like, because amorphous polymers are produced as by-product in large amounts.

Organo-magnesium compounds are also used for the production of catalysts on carriers, for example, as follows: (1) Titanium trichloride on a magnesium chloride carrier is produced by reducing the compound of a transition metal (e.g. titanium tetrachloride) with an organo-magnesium compound (U.S. Pat. No. 3,917,575); (2) titanium trichloride catalyst on a carrier is produced by reducing the compound of a transition metal (e.g. titanium tetrachloride) with a suspension of the reaction product resulting from an organo-magnesium compound and an organo-aluminum compound [Japanese Patent Publication (unexamined) Nos. 142,689/1975 and 154,388/1975]; and (3) titanium tetrachloride on a magnesium chloride carrier is produced by reacting Grignard compound with gaseous hydrogen chloride (Japanese Patent Publication No. 41,676/1972). These catalysts on carriers are very useful for the polymerization of ethylene, but their value as catalysts is low in the polymerization of propylene because amorphous polymers are produced as by-product in large amounts.

As examples of a catalyst on carriers for the polymerization of α-olefins (e.g. propylene), there may be given catalysts produced by co-pulverizing magnesium chloride, durene and a titanium tetrachloride/ester complex [Japanese Patent Publication (unexamined) No. 86,482/1974] or by co-pulverizing magnesium chloride, silicon tetrachloride and an ester followed by reaction with titanium tetrachloride [Japanese Patent Publication No. 36,786/1977]. In these processes, pulverization is essential, and without pulverization, the catalysts obtained are extremely poor in catalytic activity. Further, the catalyst particles easily become fine on account of the pulverization, so that the resulting polymer is rich in fine particles and very broad in particle size distribution. Consequently, the bulk density of the polymer is very small. Also, the catalyst obtained is poor in catalytic activity and stereoregularity, so that it is too unsatisfactory for use in the industrial stereoregular polymerization of α-olefins.

Previously, the inventors found that a component formed by depositing titanium tetrachloride on the solid reaction product resulting from a Grignard compound, a halogeno-silicon compound and/or a halogeno-aluminum compound can be changed into olefin polymerization catalysts of extremely high activity by combining the component with an organo-aluminum compound [Japanese Patent Publication (unexamined) No. 74,686/1977].

But this catalyst is not satisfactory in terms of stereoregularity. The inventors extensively studied to produce a catalyst which is more superior in activity than those produced by the foregoing processes and at the same time which is helpful for obtaining α-olefin polymers of high stereoregularity. As a result, it was found that a solid catalyst comprising a carrier produced by treating a solid reaction product resulting from an organo-magnesium compound and a halogeno-silicon compound and/or a halogeno-aluminum compound with an electron donor and titanium tetrachloride deposited on the carrier, is highly active in α-olefin polymerization and capable of producing polymers having high stereoregularity, large bulk density, large particle size and narrow particle size distribution. The inventors thus attained the present invention.

An object of the present invention is to provide a process for producing a catalyst which is highly active and produces highly stereoregular olefin polymers.

According to the present invention, there is provided a process for producing highly stereoregular α-olefin polymers characterized in that α-olefin is polymerized with a catalyst system comprising three components A, B and C:

A: a solid catalyst produced as follows:

(1) an organo-magnesium compound is reacted with at least one halogen-containing compound of (a) and (b), (a) halogen-silicon compounds of the formula, $$R_n^1SiX_{4-n}$$

wherein $R^1$ is a $C_1$-$C_8$ alkyl, aryl or alkenyl group, X is a halogen atom and n is a number satisfying $0 \leq n < 4$, (b) halogeno-aluminum compounds of the formula, $$R_l^2AlX_{3-l}$$

wherein $R^2$ is a $C_1$-$C_8$ alkyl, aryl or alkenyl group, X is a halogen atom and l is a number satisfying $0 \leq l < 3$, at 0° to 100° C. in the former to the latter molar ratio of 1:10 to 10:1, and the resulting solid product is separated from the reaction system and washed with an inert hydrocarbon solvent, (2) the solid product is reacted, at −50° to 150° C., with an electron donor of $10^{-5}$ to 0.1 mole per gram of solid product, selected from the group consisting of amines, amides, ethers, esters, alcohols, ketones, phosphines, phosphites and sulfides, and the resulting solid carrier is separated from the reaction system and washed with an inert hydrocarbon solvent, and (3) the solid carrier is reacted with titanium tetrachloride of 0.01 to 10 moles per gram of solid carrier at 0° to 150° C., and the resulting solid catalyst is separated from the reaction system and washed with an inert hydrocarbon solvent, B: an activating agent of the formula, $$R_m^3AlY_{3-m}$$

wherein $R^3$ is a $C_1$-$C_8$ alkyl, aryl or alkenyl group, Y is a halogen or hydrogen atom and m is a number satisfying $2 \leq m \leq 3$, and C: an electron donor selected from the group consisting of amines, amides, ethers, esters, alcohols, phenols, ketones, phosphines, phosphites, sulfides, and lactones.

The characteristic of the present invention consists in making use of a novel solid carrier produced by reacting a novel solid product having a substantially different chemical structure from magnesium chloride with an electron donor, the solid product being obtained by the reaction among an organo-magnesium compound and a halogeno-silicon compound and/or a halogeno-aluminum compound. The solid carrier is characterized in that it has a spherical form, large particle size and narrow particle size distribution. Further, the lack of necessity of pulverization for production of the solid carrier and solid catalyst is one characteristic of the process of the present invention. When propylene is polymerized using the solid catalyst produced by the reaction between the solid carrier and titanium tetrachloride, the catalytic activity per titanium atom is higher and the polymers obtained are of higher stereoregularity, larger bulk density and narrower particles size distribution than by the well-known catalysts on carriers produced with magnesium chloride carriers.

The attached FIGURE shows the particle size distribution of polypropylene produced in Example 1 (E) and Comparative example 4. The curve I is the particle size distribution of polypropylene produced in Example 1 (E) and the curve II is that of the other case.

In the present invention, the organo-magnesium compound used for the production of said solid product may be of any type of those which are produced by the reaction between an organo-halogen compound and metallic magnesium. For example, Grignard compounds of the formula, RMgX, in which R is a $C_1$-$C_8$ alkyl, aryl or alkenyl group and X is a halogen atom, and dialkylmagnesium compounds of the formula, $R_2Mg$, are used preferably. Of these, Grignard compounds of the formula, RMgX, are particularly preferred, and further, alkylmagnesium chlorides are most preferred.

Specific examples of Grignard compounds include ethylmagnesium chloride, n-propylmagnesium chloride, n-butylmagnesium chloride, isoamylmagnesium chloride, phenylmagnesium chloride, n-butylmagnesium bromide, ethylmagnesium iodide and the like. Specific examples of dialkylmagnesium include diethylmagnesium, di-n-propylmagnesium, di-n-butylmagnesium, di-n-hexylmagnesium, n-butylethylmagnesium, diphenylmagnesium, dibenzylmagnesium and the like.

These organo-magnesium compounds are synthesized in the presence of a solvent, and the solvent includes ether solvents (e.g. diethyl ether, di-n-propyl ether, di-n-butyl ether, diisoamyl ether, tetrahydrofuran), hydrocarbon solvents (e.g. n-hexane, n-heptane, n-octane, cyclohexane, benzene, toluene, xylene) and mixtures of the ether solvent and hydrocarbon solvent.

The halogeno-silicon compounds of the formula, $R_n^1SiX_{4-n}$ (wherein $R^1$ is a $C_1$-$C_8$ alkyl, aryl or alkenyl group, X is a halogen atom and n is a number satisfying $0 \leq n < 4$), which are used for reaction with the organo-magnesium compounds, include all the compounds having a silicon-halogen (Si-X) linkage. Preferred compounds are those having many halogen atoms. Specifically, there may be mentioned silicon tetrachloride, silicon tetrabromide, methylsilyl trichloride, dimethylsilyl dichloride, trimethylsilyl chloride, ethylsilyl trichloride, n-propylsilyl trichloride, n-butylsilyl trichloride, methylsilyl tribromide, vinylsilyl trichloride and the like. Of these, silicon tetrachloride is particularly preferred.

The halogeno-aluminum compounds of the formula, $R_l^2AlX_{3-l}$ (wherein $R^2$ is a $C_1$-$C_8$ hydrocarbon group, X is a halogen atom and l is a number satisfying $0 \leq l < 3$), which are used for reaction with the organo-magnesium compounds, include all the compounds having an aluminum-halogen (Al-X) linkage. Particularly, aluminum trihalide, alkylaluminum dihalide, dialkylaluminum halide and alkylaluminum sesquihalide are preferred. Specifically, there may be mentioned anhydrous aluminum chloride, anhydrous aluminum bromide, ethylaluminum dichloride, n-propylaluminum dibromide, diethylaluminum chloride, di-n-propylaluminum chloride, methylaluminum sesquichloride, ethylaluminum sesquichloride and the like. Of these, anhydrous aluminum chloride, ethylaluminum dichloride, diethylaluminum chloride, ethylaluminum sesquichloride are particularly preferred.

The reaction of the organo-magnesium compound with halogeno-silicon compound and/or halogeno-aluminum compound is preferably carried out at 0° to 100° C. in a solvent. The solvent used for this reaction includes for example aliphatic hydrocarbons (e.g. n-pentane, n-hexane, n-heptane, n-octane), aromatic hydrocarbons (e.g. benzene, toluene, xylene), alicyclic hydrocarbons (e.g. cyclohexane, methylcyclohexane), ether compounds (e.g. diethyl ether, di-n-butyl ether, diisoamyl ether, tetrahydrofuran, dioxane) and mixtures of the hydrocarbon and ether compound.

Specifically, this reaction is carried out by adding dropwise a solution containing the halogen-containing compound to a solution containing the organo-magnesium compound, or adding in a reverse way. The reaction time is more than 10 minutes, preferably 30 minutes to 5 hours. The molar ratio of organo-magnesium compound to halogen-containing compound is 1:10 to 10:1, preferably 1:2 to 2:1. After the reaction, the reaction solution is allowed to stand, and the supernatant liquor is removed to obtain the reaction product which is then washed thoroughly with a purified inert hydrocarbon solvent and used for reaction with an electron donor as it is or after drying.

The inert hydrocarbon solvent includes n-pentane, n-hexane, n-heptane, n-octane, benzene, toluene, xylene, cyclohexane, methylcyclohexane, decalin and the like.

The solid product thus obtained contains 20 to 60% by weight of an ether compound and 0.001 to several percents by weight of aluminum or silicon. The X-ray diffraction pattern of this solid product is completely different from that of $MgCl_2$, showing no peak in the vicinity of $2\theta = 15°$ (X-ray source: $CuK_\alpha$ ray). Consequently, this solid product is clearly not magnesium chloride but a novel magnesium-containing compound.

The electron donor used for the reaction with the solid product includes amines (e.g. ethyl amine, diethyl amine, propyl amine, dipropyl amine, tributyl amine, N,N,N',N'-tetramethylene diamine), amides (e.g. acetic amide, benzoic acid amide, toluic acid amide), alcohols (e.g. methanol, ehtanol, propanol, hexanol, benzyl alcohol), phenols (e.g. phenol, cresol, xylenol naphthol), ethers (e.g. diethyl ether, di-n-butyl ether, diisoamyl ether, diphenyl ether, tetrahydrofuran), ketones (e.g. acetone, methylethyl ketone, acetophenon, benzophenon), phosphine (e.g. triethyl phosphine, tributyl phosphine, triphenyl phosphine), phosphite (e.g. triethyl phosphite, tributyl phosphite, triphenyl phosphite, diphenyl phosphite), sulfides (e.g. diethyl sulfide, dibutyl sulfide) and esters (e.g. methyl formate, methyl acetate, ethyl acetate, vinyl acetate, ethyl propionate, methyl methacrylate, ethyl methacrylate, methyl benzoate, ethyl benzoate, propyl benzoate, butyl benzoate, phenyl benzoate, methyl toluylate, ethyl toluylate, methyl anisate, ethyl anisate), lactones (e.g. γ-butylolactone) and the like, of which amines, amides, alcohols, ethers and esters are preferred. Further, esters are most preferred.

The esters include for example aliphtic carboxylic esters, alicyclic carboxylic esters, olefinic carboxylic esters and aromatic carboxylic esters. Of these, olefinic carboxylic esters and aromatic monocarboxylic esters are preferred, and particularly aromatic monocarboxylic esters are preferred. Specifically, there may be mentioned methyl benzoate, ethyl benzoate, ethyl p-anisate and the like.

The amount of the electron donor used is $10^{-5}$ to 0.1 mole per gram of solid product, preferably $5 \times 10^{-4}$ to 0.02 mole per gram of solid product.

The reaction between the electron donor and the solid product is carried out by the slurry method in which the both are contacted with each other in the presence of a diluent. This method is desirable in terms of particle size and particle size distribution. The diluent includes aliphatic hydrocarbons (e.g. pentane, hexane, heptane, octane), aromatic hydrocarbons (e.g. benzene, toluene, xylene) and alicyclic hydrocarbons (e.g. cyclohexane, cyclopentane, methylcyclohexane). The diluent is used in an amount of 0.1 to 1000 ml per gram of solid product, preferably 1 to 100 ml per gram of solid product. The reaction temperature is $-50°$ to $150°$ C., preferably 0° to 100° C. The reaction time is more than 10 minutes, preferably 30 minutes to 3 hours.

After the reaction is finished, the reaction solution is allowed to stand still and the supernatant liquor is removed. The reaction product thus obtained is then repeatedly washed with an inert hydrocarbon solvent to obtain a white solid carrier. The solid carrier contains 1 to 30% by weight of an ether compound and 1 to 20% by weight of the electron donor. The X-ray diffraction pattern of this solid carrier is completely different from that of magnesium chloride, which means that the solid carrier is not magnesium chloride but a novel compound having a complicated chemical structure.

Next, the solid carrier thus obtained is made to carry titanium tetrachloride. For this purpose, the well-known methods such as impregnation method, kneading method, co-precipitation method and the like are used. In the present invention, however, titanium tetrachloride and the solid carrier are contacted with each other without a solvent or in the presence of a suitable inert hydrocarbon solvent. This method is advantageous in terms of particle size and particle size distribution. The amount of titanium tetrachloride used is 0.01 to 10 moles per gram of solid carrier. The reaction is preferably carried out at 0° to 150° C. The reaction time is more than 10 minutes, preferably 30 minutes to 3 hours. After the reaction is finished, the reaction solution is allowed to stand still and the supernatant liquor is removed. The reaction product thus obtained is then thoroughly washed with an inert hydrocarbon solvent to obtain a solid catalyst. The amount of titanium tetrachloride to be deposited on the carrier is 0.1 to 20% by weight, particularly preferably 0.5 to 10% by weight, as converted to the amount of titanium contained in the produced solid catalyst. Since the titanium content depends largely upon the properties of the solid carrier and the deposition conditions, it is desirable to determine the deposition conditions so as to keep the titanium content within the foregoing range. Usually, the solid catalyst contains 0.1 to 15% by weight of an ether compound and 0.1 to 10% by weight of the electron donor, and its surface area is more than 200 m²/g.

As the specific examples of the activating agent (B) of the formula, $R_m^3AlY_{3-m}$ (wherein $R^3$ is a $C_1-C_8$ straight or branched alkyl, alicyclic hydrocarbon or aromatic hydrocarbon group, Y is a halogen or hydrogen atom and m is a number satisfying $2 \leq m \leq 3$), which is one component constituting the catalyst system used for olefin polymerization in the present invention, trialkylaluminum and a mixture of trialkylaluminum and dialkylaluminum halide are preferred. Of these, triethylaluminum and a mixture of triethylaluminum and diethylaluminum chloride are particularly preferred.

The molar ratio of titanium to activating agent in the solid catalyst used for α-olefin polymerization is within a wide range of 10:1 to 1:500. But a range of 2:1 to 1:200 is particularly preferred. When the α-olefin polymerization is carried out in the presence of an electron donor, an improvement in stereoregularity can be achieved very effectively. The electron donor (C) includes amines, amides, ethers, esters, alcohols, phenols, ketones, phosphines, phosphites, sulfides, lactones and the like, of which esters are preferred. Specific examples of the electron donor (C) may be the same compounds with those used for the reaction with the solid product described above. Of the esters, olefinic carboxylic esters and aromatic monocarboxylic esters are particularly preferred. Specifically, there may be mentioned methyl methacrylate, ethyl benzoate, ethyl p-anisate, methyl p-toluylate and the like. The molar ratio of titanium to electron donor in the solid catalyst is 10:1 to 1:500, preferably 2:1 to 1:200.

The electron donor may be mixed with the activating agent prior to use. A preferred combination of the activating agent and electron donor includes a system comprising triethylaluminum and the ester and that comprising triethylaluminum, diethylaluminum chloride and the ester.

The polymerization can be carried out over a temperature range of −30° to 200° C. Within a range lower than 0° C., the rate of polymerization lowers, while at higher than 100° C., polymers having a high stereoregularity can not be obtained. Consequently, it is generally desirable to carry out the polymerization within a range of 0° to 100° C. The polymerization pressure is not particularly limited, but a pressure of 3 to 100 atm. is preferred from the industrial and economical points of view. The polymerization may be carried out by either continuous or batch process. Alternatively, the polymerization may be carried out according to the slurry process using an inert hydrocarbon solvent (e.g. propane, butane, pentane, hexane, heptane, octane), or according to the liquid-phase or gaseous-phase process without a solvent.

α-Olefins which can be utilized in the process of the present invention are those having 3 to 10 carbon atoms. Sepcifically, they include propylene, butene-1, pentene-1, hexene-1, 3-methylphentene-1,4-methylpentene-1 and the like. But the present invention is not limited to these olefins. The process of the present invention may be carried out in either a homopolymerization or copolymerization process (including copolymerization with ethylene). In the case of copolymerization, copolymers can be obtained by mixing two kinds or more of olefin to bring them into contact.

Further, the process of the present invention can easily be carried out according to the heteroblock copolymerization process in which polymerization is carried out in two steps or more.

The process of the present invention will be illustrated with reference to the following examples, which are not however to be interpreted as limiting the invention thereto.

EXAMPLE 1

(A) Synthesis of organo-magnesium compound

Magnesium chip (16.1 g) for the preparation of Grignard reagent was placed in a 1-liter flask equipped with a stirrer, reflux condenser and dropping funnel, and moisture on the inside surface of the flask and the surface of magnesium was completely expelled from the flask by passing argon gas therethrough at 120° C. for 2 hours. Thereafter, a mixture of n-butyl chloride (71 ml: its molar ratio to magnesium, 1) and diethyl ether (275 ml) in the dropping funnel was added dropwise to magnesium in the flask to start the reaction. The mixture was added over 1 hour under reflux of diethyl ether, and then the reaction was continued for a further 3 hours at the same temperature to obtain a solution of n-butylmagnesium chloride in diethyl ether. The concentration of the chloride in this solution was 2.0 mole/l.

(B) Reaction between organo-magnesium compound and halogeno-silicon compound The atmosphere in a 500-ml flask equipped with a stirrer and dropping funnel was replaced by argon, and then the solution (250 ml) of n-butylmagnesium chloride in ethyl ether synthesized in (A) was added to the flask. Thereafter, silicon tetrachloride (56 ml: the molar ratio of magnesium to silicon, 1:1) was slowly added dropwise from the dropping funnel under reflux of ethyl ether to produce a white precipitate. The reaction was continued for 3 hours under reflux of ethyl ether, and the supernatant liquor was removed. The precipitate was washed with n-heptane and dried under reduced pressure to obtain a solid product (63 g).

(C) Synthesis of Solid Carrier

The atmosphere in a 200-ml flask equipped with a stirrer and dropping funnel was replaced by argon, and then the solid product (10 g) synthesized in (B) was added to the flask and slurried with addition of n-heptane (100 ml). Thereafter, ethyl benzoate (7.5 ml) was added dropwise from the dropping funnel over 15 minutes with stirring, and the reaction was continued at 30° C. for 1 hour. After the reaction was finished, the supernatant liquor was removed, and the reaction product was washed with n-heptane and dried under reduced pressure to obtain a solid carrier (10.1 g).

(D) Deposition of Titanium Tetrachloride on Carrier

The atmosphere in a 100-ml flask equipped with a stirrer was replaced by argon, and then the solid carrier (5 g) obtained in (C) was added to the flask and slurried with addition of titanium tetrachloride (30 ml). Reaction was carried out at 100° C. for 1 hour with stirring. After the reaction was finished, the reaction solution was allowed to stand still and the supernatant liquor was removed. Thereafter, the reaction product was repeatedly washed with n-heptane until titanium tetrachloride was no longer detectable in the washing liquor, and then dried under reduced pressure to obtain a solid catalyst (4.7 g).

This solid catalyst contained 1.8% by weight of titanium.

(E) Polymerization of Propylene I

The atmosphere in a 5-liter stainless steel autoclave was replaced by argon, and then n-heptane solution (5 ml) containing triethylaluminum (1.0 g) and ethyl p-anisate (0.52 g) and the solid catalyst (230 mg) obtained in (D) were added thereto. Thereafter, hydrogen corresponding to a partial pressure of 0.5 kg/cm$^2$ and then liquid propylene (1.4 kg) were charged in the autoclave under pressure. The contents of the autoclave were kept at 70° C. for 2 hours with stirring. After the polymerization was finished, an excess of propylene was purged, and the resulting polymer was dried to obtain a white powdery polypropylene (310 g). The activity of the catalyst was 37500 g/gTi.hr. Further, the boiling heptane insoluble portion of the polypropylene was 95.2%, and the polypropylene had a bulk density of 0.405 g/ml.

The particle size distribution of this polypropylene is shown in the figure as curve I.

(F) Polymerization of Propylene II

The procedure was carried out in the same manner as in (E) except that diethylaluminum chloride (0.53 g) was added in addition of triethylaluminum (1.0 g) and that the amount of the solid catalyst used was 210 mg. Thus, a white powdery polypropylene (393 g) was obtained.

The activity of the catalyst was 52000 g/gTi.hr, and the boiling heptane-insoluble portion of the polypropylene was 92.3%.

EXAMPLE 2

The procedure was carried out in the same manner as in (A) of Example 1 except that di-n-butyl ether (340 ml) was used in place of ethyl ether and that the reaction was carried out at 70° C. Thus, a solution of n-butylmagnesium chloride in di-n-butyl ether was obtained. Using this solution, the same procedures as in (B), (C) and then (D) of Example 1 were carried out, except taht the reaction temperature in (B) was 50° C. Thus, a solid catalyst having a titanium content of 1.5% by weight was obtained. Using this catalyst, propylene was polymerized in the same manner as in (E) of Example 1, and it was found that the activity of the catalyst was 35900 g/gTi.hr. The boiling heptane-insoluble portion of the polypropylene was 94.6%.

Comparative Example 1

The atmosphere in a 5-liter stainless steel autocalve was replaced by argon, and then diethylaluminum chloride (1.5 g) and the solid catalyst (250 mg) obtained in (D) of Example 1 were added thereto together with heptane (100 ml). Thereafter, hydrogen corresponding to a partial pressure of 0.5 kg/cm$^2$ and then liquid propylene (1.4 kg) were charged in the autoclave under pressure. The contents of the autoclave were kept at 70° C. for 2 hours with stirring.

After the polymerization was finished, an excess of propylene was purged, and the resulting polymer was dried to obtain polypropylene (51 g). The activity of the catalyst was 5700 g/gTi.hr, and the boiling heptane-insoluble portion of the polypropylene was 75.9%.

Comparative Example 2

Propylene was polymerized in the same manner as in (E) of Example 1 except that ethyl p-anisate was not used and that 200 mg of the solid catalyst obtained in (D) of Example 1 was used. As a result, it was found that the activity of the catalyst was 53100 g/gTi.hr and the boiling heptane-insoluble portion of the resulting polypropylene was 77.1%.

Comparative Example 3

The solid product obtained in (B) of Example 1 was reacted with titanium tetrachloride in the same manner as in (D) of Example 1 without pre-treating it with an electron donor. Thus, a solid catalyst having a titanium content of 1.6% by weight was obtained. Using this catalyst, propylene was polymerized in the same manner as in (E) of Example 1, and it was found that the activity of the catalyst was 36800 g/gTi.hr. The boiling heptane-insoluble portion of the resulting polypropylene was 87.5%.

Comparative Example 4

A solid catalyst having a titanium content of 1.9% by weight was obtained in the same manner as in (C) and then (D) of Example 1 except that, in (C), commercially available anhydrous magnesium chloride (10 g), being previously powdered by mechanical means, was used in place of the solid product obtained in (B) of Example 1.

Using this catalyst, propylene was polymerized in the same manner as in (E) of Example 1, and it was found that the activity of the catalyst was 29000 g/gTi.hr. The boiling heptane-insoluble portion of the resulting polypropylene was 92.9%.

This polypropylene had a bulk density of 0.334 g/ml. The particle size distribution of the polypropylene is shown in the figure as curve II.

EXAMPLE 3

A solid product was obtained in the same manner as in (B) of Example 1 except that the amount of silicon tetrachloride was decreased to one half (consequently, the molar ratio of magnesium to silicon was 2:1), and that n-heptane (50 ml) was added together with silicon tetrachloride. Using this product, a solid catalyst was obtained in the same manner as in (C) and (D) of Example 1.

Using this catalyst, propylene was polymerized in the same manner as in (E) of Example 1, and it was found that the activity of the catalyst was 33800 g/gTi.hr. The boiling heptane-insoluble portion of the resulting polypropylene was 94.9%.

EXAMPLE 4

A solid catalyst was obtained in the same manner as in (B), (C) and then (D) of Example 1 except that, in (B), methylsilyl trichloride was used in place of silicon tetrachloride (molar ratio of magnesium to silicon, 1:1). Using this catalyst, propylene was polymerized in the same manner as in (E) of Example 1, and it was found that the activity of the catalyst was 32700 g/gTi.hr.

The boiling heptane-insoluble portion of the resulting polypropylene was 94.1%.

EXAMPLE 5

A solid carrier was obtained in the same manner as in (C) of Example 1 except that ethyl p-anisate (8.0 ml) was used in place of ethyl benzoate. Thereafter, using this carrier, a solid catalyst was obtained in the same manner as in (D) of Example 1. Using this catalyst, propylene was polymerized in the same manner as in (E) of Example 1, and it was found that the activity of the catalyst was 36000 g/gTi.hr. The boiling heptane-insoluble portion of the resulting polypropylene was 94.2%.

EXAMPLE 6

A solid catalyst was obtained in the same manner as in (D) of Example 1 except that titanium tetrachloride (10 ml) and n-heptane (20 ml) were used in place of titanium tetrachloride (30 ml), and that the reaction was carried out at 80° C. for 2 hours. Using this catalyst, propylene was polymerized in the same manner as in (E) of Example 1, and it was found that the activity of the catalyst was 31900 g/gTi.hr. The boiling heptane-insoluble portion of the resulting polypropylene was 93.8%.

EXAMPLE 7

A solid product was obtaind in the same manner as in (B) of Example 1 except that a solution of di-n-hexylmagnesium in hexane (molar ratio of magnesium to silicon, 1:1) was used in place of the n-butylmagnesium chloride solution, and that the reaction temperature was 70° C. Using this product, a solid catalyst was obtained in the same manner as in (C) and (D) of Example 1. Using this catalyst, propylene was polymerized in the same manner as in (E) of Example 1, and it was found that the activity of the catalyst was 30800 g/gTi.hr. The boiling heptane-insoluble portion of the resulting polypropylene was 93.1%.

EXAMPLE 8

(A) Reaction Between Organo-Magnesium Compound and Halogeno-Aluminum Compound The atmosphere in a 1-liter flask equipped with a stirrer and dropping funnel was replaced by argon, and then a solution (250 ml) of n-butylmagnesium chloride in diethyl ether obtained in (A) of Example 1 was added thereto. Thereafter, n-heptane (200 ml) and diethylaluminum chloride (63 ml) (molar ratio of magnesium to aluminum, 1:1) were slowly added dropwise from the dropping funnel to produce a white precipitate, during which the temperature was kept at 30° C.

The reaction was continued at 35° C. for a further 3 hours, and the precipitate was separated, washed and dried under reduced pressure to obtain a solid product (61 g).

(B) Synthesis of Solid Carrier

The atmosphere in a 200-ml flask equipped with a stirrer and dropping funnel was replaced by argon, and then the solid product (10 g) synthesized in (A) was added thereto and slurried with addition of n-heptane (100 ml). Thereafter, ethyl benzoate (7.5 ml) was added dropwise from the dropping funnel over 15 minutes with stirring, followed by reaction at 30° C. for a further 1 hour. After the reaction was finished, the reaction product was separated, washed and dried under reduced pressure to obtain a solid carrier (9.8 g).

(C) Deposition of Titanium Tetrachloride on Carrier

The atmosphere in a 100-ml flask equipped with a stirrer was replaced by argon, and the carrier (5 g) obtained in (B) was added thereto and slurried with addition of titanium tetrachloride (30 ml). Reaction was carried out at 100° C. for 1 hour with stirring. After the reaction was finished, the supernatant liquor was removed, and the reaction product was repeatedly washed with n-heptane until titanium tetrachloride was no longer detectable in the washing liquor, and then dried under reduced pressure to obtain a solid catalyst (4.7 g). This solid catalyst contained 3.9% by weight of titanium.

(D) Polymerization of Propylene I

Using the solid catalyst obtained in (C), propylene was polymerized in the same manner as in (E) of Example 1, and it was found that the activity of the catalyst was 21900 g/gTi.hr. The boiling heptane-insoluble portion of the resulting polypropylene was 94.8%.

(E) Polymerization of Propylene II

Using the solid catalyst obtained in (C), propylene was polymerized in the same manner as in (F) of Example 1, and it was found that the activity of the catalyst was 32000 g/gTi.hr. The boiling heptane-insoluble portion of the resulting polypropylene was 92.3%.

EXAMPLE 9

A solution of n-butylmagnesium chloride in di-n-butyl ether was obtained in the same manner as in (A) of Example 1 except that di-n-butyl ether (340 ml) was used in place of diethyl ether, and that the reaction was carried out at 70° C. Using this solution, a solid catalyst was obtained in the same manner as in (A), (B) and then (C) of Example 8. This solid catalyst contained 3.5% by weight of titanium.

Using this catalyst, propylene was polymerized in the same manner as in (E) of Example 1, and it was found that the activity of the catalyst was 23000 g/gTi.hr. The boiling heptane-insoluble portion of the resulting polypropylene was 94.6%.

Comparative Example 5

Using the solid catalyst (200 mg) obtained in (C) of Example 8, propylene was polymerized in the same manner as in Comparative Example 2, and it was found that the activity of the catalyst was 31400 g/gTi.hr. The boiling heptane-insoluble portion of the resulting polypropylene was 78.3%.

Comparative Example 6

The solid product obtained in (A) of Example 8 was treated with titanium tetrachloride in the same manner as in (C) of Example 8 without pre-treating it with an electron donor. Thus, a solid catalyst having a titanium content of 4.2% by weight was obtained. Using this catalyst, propylene was polymerized in the same manner as in (E) of Example 1, and it was found that the activity of the catalyst was 19800 g/gTi.hr. The boiling heptane-insoluble portion of the resulting polypropylene was 90.8%.

EXAMPLE 10

The atmosphere in a 200-ml flask equipped with a stirrer and dropping funnel was replaced by argon, and then anhydrous aluminum chloride (5.3 g) purified by sublimation was added thereto and dissolved in di-n-butyl ether (60 ml). Thereafter, a solution (20 ml) of n-butylmagnesium chloride in di-n-butyl ether (molar ratio) of magnesium to aluminum, 1:1) prepared in Example 2 was slowly added dropwise from the dropping funnel to produce a white precipitate, during which the temperature was kept at 30° C. The reaction was continued at 30° C. for further 3 hours, and the resulting solid product was separated and washed. Using this product, a solid catalyst was obtained in the same manner as in (C) and (D) of Example 1. Using this catalyst, propylene was polymerized in the same manner as in (E) of Example 1, and it was found that the activity of the catalyst was 23000 g/gTi.hr. The boiling heptane-insoluble portion of the resulting polypropylene was 94.3%.

EXAMPLE 11

A solid carrier was obtained in the same manner as in (B) of Example 8 except that ethyl p-anisate (8.0 ml) was used in place of ethyl benzoate. Using this carrier, a solid catalyst was contained in the same manner as in (C) of Example 8. Thereafter, using this catalyst, propylene was polymerized in the same manner as in (E) of Example 1, and it was found that the activity of the catalyst was 21000 g/gTi.hr. The boiling heptane-insoluble portion of the resulting polypropylene was 94.2%.

EXAMPLE 12

A solid catalyst was obtained in the same manner as in (C) of Example 8 except that titanium tetrachlororide (10 ml) and n-heptane (20 ml) were used in place of titanium tetrachloride (30 ml), and that the reaction was carried out at 80° C. for 2 hours. Using this catalyst, propylene was polymerized in the same manner as in (E) of Example 1, and it was found taht the activity of the catalyst was 20100 g/gTi.hr. The boiling heptane-insoluble portion of the resulting polypropylene was 94.1%.

What is claimed is:

1. A process for producing a highly stereoregular α-olefin polymer which comprises polymerizing an α-olefin with a catalyst system comprising three components A, B and C:

A: a solid catalyst produced as follows:

(1) an organo-magnesium compound represented by the general formula RMgX, wherein R is $C_1$–$C_8$ alkyl, aryl or alkenyl group and X is a halogen atom, synthesized in the presence of an ether (I) solvent is reacted in solution is said ether with at least one halogen-containing compound of (a) and (b), (a) halogeno-silicon compounds of the formula

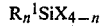

wherein $R^1$ is a $C_1$–$C_8$ alkyl, aryl or alkenyl group, X is a halogen atom and n is a number satisfying $0 \leq n < 4$, (b) halogeno-aluminium compounds of the formula

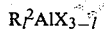

wherein $R^2$ is a $C_1$–$C_8$ alkyl, aryl or alkenyl group, X is a halogen atom and l is a number satisfying $0 \leq l < 3$, at 0° to 100° C. in the former to the latter molar ratio of 1:10 to 10:1, and the resulting solid product is separated from the reaction system and washed with an inert hydrocarbon solvent, thereby obtaining a solid product containing 20 to 60% by weight of said ether (I), (2) the solid product is reacted, at −50° to 150° C., with an electron donor of $10^{-5}$ to 0.1 mole per gram of solid product, selected from the group consisting of amines, amides, ethers, esters, alcohols, phenols, ketones, nitriles, phosphines, phosphites, sulfides, and lactones, and the resulting solid carrier is separated from the reaction system and washed with an inert hydrocarbon solvent, thereby obtaining a solid carrier containing 1 to 30% by weight of the ether (I) and 1 to 20% by weight of the electron donor, and (3) the solid carrier is reacted with titanium tetrachloride of 0.01 to 10 moles per gram of solid carrier at 0° to 150° C., and the resulting solid catalyst is separated from the reaction system and washed with an inert hydrocarbon solvent, thereby obtaining a solid catalyst containing 0.1 to 15% by weight of the ether (I) and 0.1 to 10% by weight of the electron donor and 0.1 to 20% by weight of titanium, B: an activating agent of the formula,

where $R^3$ is a $C_1$–$C_8$ alkyl, aryl or alkenyl group, Y is a halogen or hydrogen atom and m is a number satisfying $2 \leq m \leq 3$ and C: an electron donor selected from the group consisting of amines, amides, ethers, esters, alcohols, phenols, ketones, nitriles, phosphines, phosphites, sulfides, and lactones, the molar ratio of titanium to activating agent being 10:1 to 1:500 and the molar ratio of titanium to electron donor (c) being 10:1 to 1:500.

2. A process according to claim 1, wherein said ether (I) is diethyl ether, n-propyl ether, di-n-butyl ether, di-iso-amyl ether or tetrahydrofuran.

3. A process according to claim 1, wherein the organo-magnesium compound is an alkylmagnesium chloride.

4. A process according to claim 1, wherein said halogeno-silicon compound is silicon tetrachloride.

5. A process according to claim 1, wherein said halogeno-aluminum compound is anhydrous aluminum trihalide, alkylaluminum dihalide dialkylaluminum halide or alkylalauminum sesquihalide.

6. A process according to claim 1, wherein said electron donor used for the production of the solid carrier is a amine, amide, alcohol, ether or ester compound.

7. A process according to claim 6, wherein the electron donor is an ester compound.

8. A process according to claim 1, wherein said activating agent as a component B is trialkylaluminum or a mixture of trialkylalauminum and dialkylaluminum halide.

9. A process according to claim 1, wherein said electron donor as a component C is an ester compound.

* * * * *